United States Patent [19]

Semke

[11] 4,187,563
[45] Feb. 12, 1980

[54] FLUSHING DEVICE

[76] Inventor: Victor Semke, 10617 Chamonieux Dr., Palos Hills, Ill. 60465

[21] Appl. No.: 927,009

[22] Filed: Jul. 24, 1978

[51] Int. Cl.² .......................... E03C 1/306; F16L 5/02
[52] U.S. Cl. ......................................... 4/256; 285/191
[58] Field of Search .................................. 4/255–257, 4/286, 187 A; 285/191, 199; 15/104.05; 154/167 C; 269/243; 29/526 R

[56] References Cited

U.S. PATENT DOCUMENTS

| | | | |
|---|---|---|---|
| 532,376 | 1/1895 | Hoyt | 4/255 |
| 550,914 | 12/1895 | Hoyt | 4/255 |
| 608,207 | 8/1898 | Merntt | 285/191 |
| 1,013,175 | 1/1912 | Jones | 4/255 |
| 1,173,854 | 2/1916 | Pearch | 4/256 |
| 1,395,125 | 10/1921 | Lewis et al. | 4/256 |
| 1,773,640 | 8/1930 | Prasivka | 285/191 |
| 1,985,813 | 12/1934 | Baden | 4/256 |
| 2,024,873 | 12/1935 | Perry | 4/256 |
| 2,055,801 | 9/1936 | Perry | 4/236 X |
| 2,061,553 | 11/1936 | Acosta | 4/256 X |
| 2,197,716 | 4/1940 | Whitaker | 4/256 |
| 2,215,360 | 9/1940 | Lundstrom | 285/191 |
| 2,529,587 | 11/1950 | Bates et al. | 4/257 |
| 2,570,546 | 10/1951 | Hamlett | 4/25.6 |

Primary Examiner—Stuart S. Levy
Attorney, Agent, or Firm—Murray and Whisenhunt

[57] ABSTRACT

A device for flushing a drain pipe of a sink by applying water under pressure to the interior of the pipe. A conduit for passing water therethrough under pressure is connected to a seal which fits over the mouth of the pipe and provides a water tight seal. At least two L-shaped members having threaded portions extend through the seal and engage an anchor point in the mouth of the pipe. A disc extends transversely between and interconnects the L-shaped members, and the conduit extends through a control aperture in the disc. Pressure is exerted on the conduit when nuts mounted on the threaded portions of the L-shaped members are urged against the disc to bring the seal into sealing engagement with the pipe. An apertured locking member is firmly secured to and interconnects the L-shaped members at a point between the location of the nuts on the L-shaped members and the ends of the L-shaped members opposite from the anchor point. The apertured locking member prevents rotation and disengagement of the L-shaped members when the seal is brought into sealing engagement with the pipe.

12 Claims, 4 Drawing Figures

FLUSHING DEVICE

BACKGROUND OF THE INVENTION

The present invention relates to an improved device for flushing a drain pipe of, for example, a kitchen sink, wash tub or other receptacle, which has become blocked or restricted by foreign material.

It is well known that drain pipes of sinks, wash tubs and other similar receptacles tend to become blocked or restricted by waste material. This generally arises due to the accumulation of waste material in the waste trap or "S-bend" in the drain pipe. One way of reducing the amount of solid matter passing down the drain pipe is to provide a perforated strainer in the mouth of the drain pipe, but such strainers do not prevent passage of relatively finely divided waste substances such as small pieces of vegetable matter and other waste material. Accordingly, it is necessary periodically to flush away waste material which is causing blockage or restriction in the drain pipe, particularly when the rate of drainage of water from the receptacle becomes unacceptably low.

Numerous flushing devices have been proposed in the past. The ancient U.S. Pat. No. 532,376 to Hoyt discloses such a device in which a plate is clamped to a sink strainer by means of L-shaped rods. These rods are provided with threaded portions and are urged against the underside of the sink strainer by thumb nut screws mounted on the threaded portions.

U.S. Pat. No. 1,173,854 to Pearch discloses a drain pipe flushing device having an inverted dish-shaped casing formed of cast iron and provided with a nozzle which is connected to a source of water. The casing is clamped into position over the sink strainer by means of thumb nuts mounted on L-shaped threaded rods in a manner similar to that described above in connection with the Hoyt patent.

U.S. Pat. No. 1,013,175 to Jones discloses a further type of sink flush device utilizing an L-shaped, threaded rod which hooks onto the sink strainer to effect clamping of the device over the mouth of the drain pipe. The device differs from the two prior devices described above in that it utilizes only one L-shaped threaded rod which is centrally disposed internally of the device.

U.S. Pat. No. 2,024,873 to Perry discloses another type of sink flush device employing an L-shaped member to secure the device in position. The L-shaped rod in the Perry patent extends through a conical-shaped sealing member which fits into the plug hole of the sink and the L-shaped rod is urged against the underside of the sink strainer by means of a coil spring.

U.S. Pat. Nos. 550,914 to Hoyt, 608,207 to Merritt, 1,395,125 to Lewis et al., 1,985,813 to Baden, 2,055,801 to Perry, 2,215,360 to Lundstrom and 2,570,546 to Hamlett all disclose flushing devices having a centrally disposed L-shaped or hook means which is urged against the underside of a sink strainer or similar anchoring means to effect clamping of the device over the mouth of the drain pipe. U.S. Pat. No. 2,529,587 to Bates et al. shows a device having a centrally disposed T-shaped member having particular applicability to the flushing of toilet bowls and bidets.

U.S. Pat. Nos. 2,061,553 to Acosta and 2,197,716 to Whitaker both disclose devices which have hook-shaped members positioned diametrically opposite each other and facing in opposite directions. These devices require the presence of a particular type of grid in the mouth of the drain pipe to allow entry of the hooks followed by rotation of the device to lock it into position.

None of the prior devices discussed above has proved entirely satisfactory. The major problems which are encountered with these devices are first they are usually very awkward to install, especially those which utilize an L-shaped hook member. Second, these devices do not provide a satisfactory seal over the drain pipe for the optimum pressures of water which are required to effectively flush the drain pipe. Third, these devices are generally cumbersome to handle and expensive to produce. As described below, the first problem referred to is particularly marked with those devices which employ more than one L-shaped hook member.

In most sinks and tubs, the strainer is supported in the mouth of the drain pipe on a ledge formed with detents, and is removable to facilitate access to the drain pipe. Occasionally, however, it is found that the strainer is permanently mounted in the mouth of the drain pipe, particularly in older domestic sink installations. Irrespective of whether the strainer is removable or not, it is necessary, when using one of the prior devices, first to align the L-shaped members so that they can be passed through the detents, or through the perforations in the strainer if not removed, prior to clamping the device over the drain pipe. When the thumb nut screws are turned, there is a tendency for the L-shaped members to rotate before they come into contact with the strainer support or the strainer plate, and they often disengage therefrom. It is, therefore, necessary with these prior device to employ both hands when tightening one thumb nut, one hand being required to hold the L-shaped member to prevent it turning and disengaging from the strainer support or strainer plate, while the other hand turns the thumb nut screw to effect tightening. Installation of such devices, therefore, is awkward, time-consuming and frustrating. In view of these disadvantages, devices of the type described above, especially of those disclosed in the Pearch and Hoyt patents, have not found wide acceptance domestically or industrially. In view of the unavailability of a sink flush device which can be easily and quickly installed to give a satisfactory seal and which can be produced at relatively low cost, unblocking of drain pipes is commonly achieved either by feeding a plumber's "snake" through the pipe to dislodge the foreign material which is awkward and inconvenient, or by using a conventional sink plunger which is also awkward to use and, ultimately, does not result in a satisfactory flushing of the drain pipe system.

OBJECTS OF THE INVENTION

It is a primary object of the present invention to provide an improved device for flushing a drain pipe of, for example, a kitchen sink, wash tub or other similar receptacle which utilizes fluid under pressure, suitably water from the faucet of the receptacle, or from another water source.

It is a further object of the present invention to provide an improved sink flush device which can be easily and quickly installed by the user.

SUMMARY OF THE INVENTION

The present invention provides a device for flushing a drain pipe provided in the mouth thereof with an anchor point. The device facilitates the application of fluid, suitably water from a faucet, under pressure to the interior of the drain pipe to flush out foreign material which is blocking or restricting the drain pipe.

The device of the present invention comprises a conduit means for passing fluid therethrough under pressure and a resilient sealing means connected to the conduit means for producing a fluid-tight seal over the mouth of the drain pipe. The sealing means is detachably secured over the mouth of the drain pipe by a securing means which includes a restraining means slidably engaged with the sealing means and engageable with the anchor point and means operatively connected to the restraining means and the sealing means for urging the restraining means against the anchor point simultaneously with urging the sealing means into sealing engagement with the pipe to create the required seal. The device also comprises means for preventing disengagement of the restraining means from the anchor point as the sealing means is brought into sealing engagement with the drain pipe.

In a preferred embodiment of the device of the present invention, a one-way valve arrangement is provided within the conduit means which permits fluid to flow from the water source into the drain pipe system but not in the reverse direction. As discussed in more detail below, this valve is preferably made of rubber and is in the form of a cone which is spring-biased by means of a coil spring.

DETAILED DESCRIPTION OF THE DRAWINGS

Embodiments of the present invention will now be described in more detail with reference to the accompanying Figures in which.

DETAILED DESCRIPTION OF THE INVENTION

Figure 1:
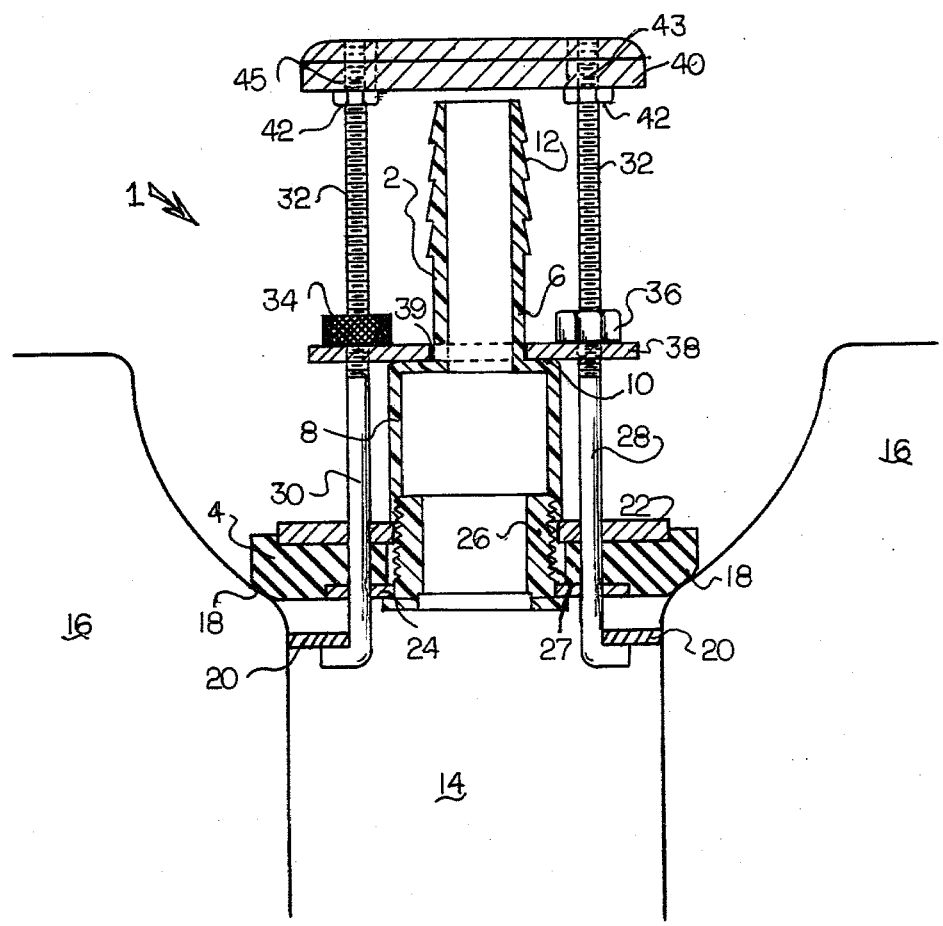
FIG. 1 is a side elevation in cross section showing the device of the present invention in position over a drain pipe.
Figure 2:
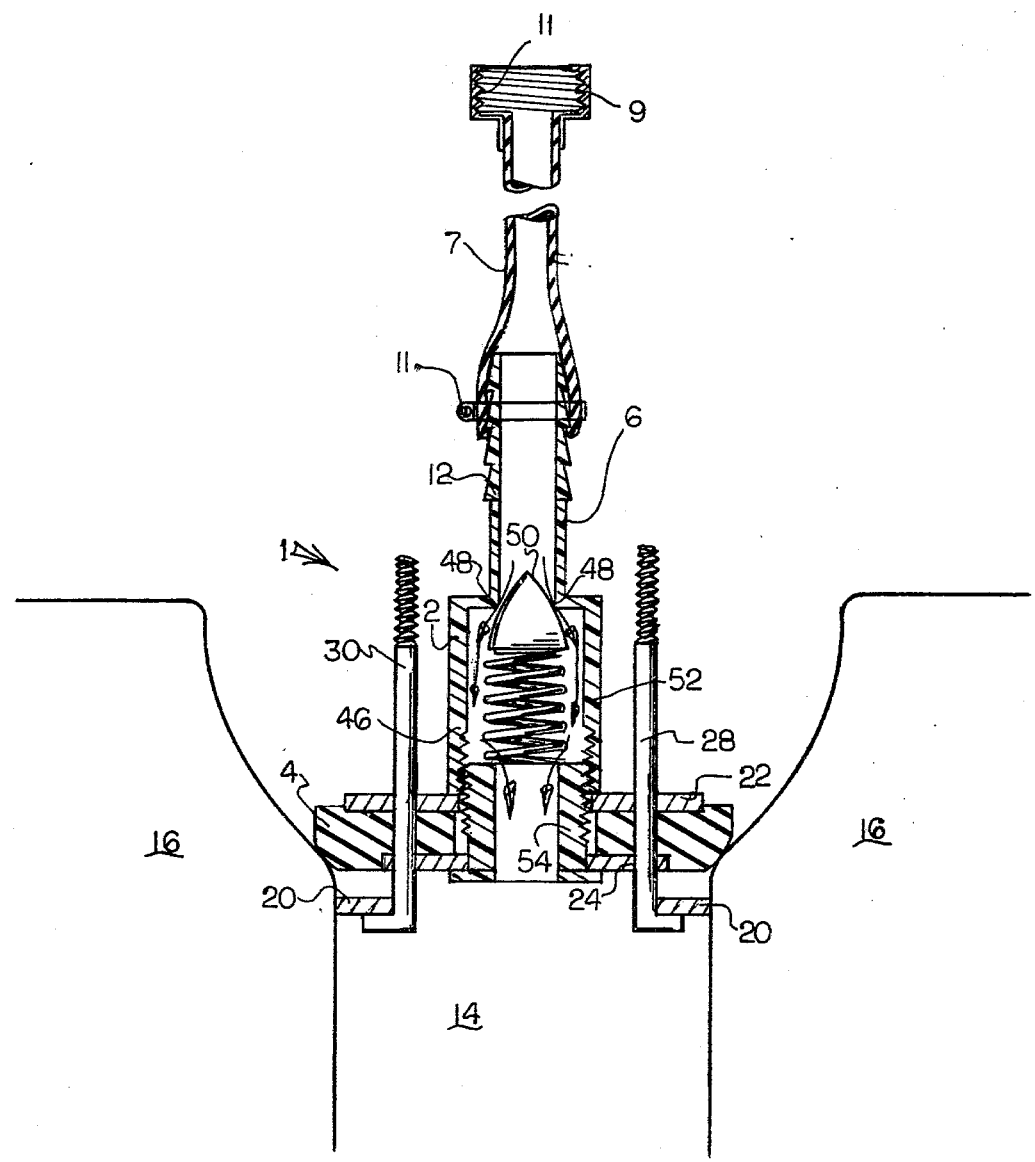
FIG. 2 is a side elevation in partial cross section with part of the device broken away, showing a one-way valve arrangement and a hose pipe fitted to the device.
Figure 3:
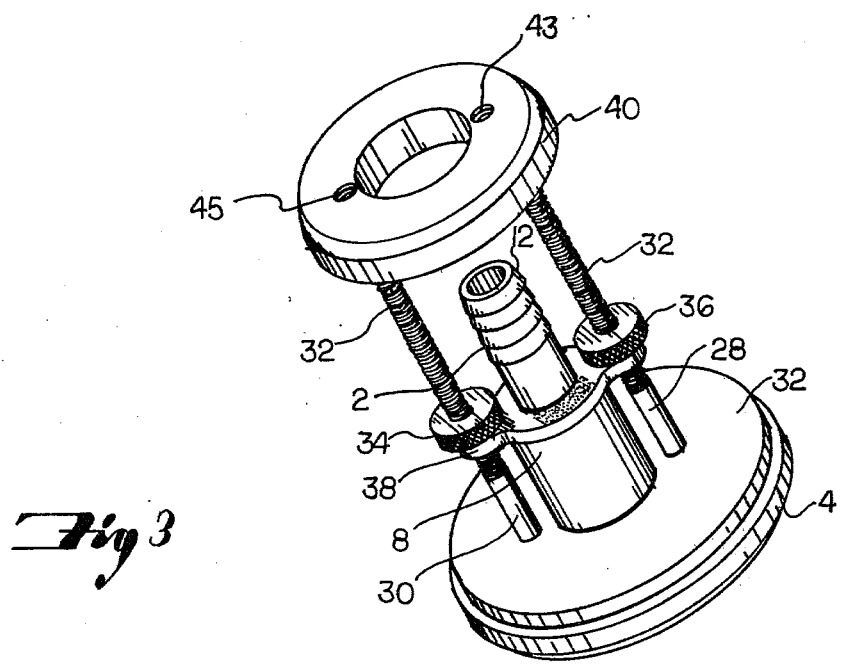
FIGS. 3 and 4 are perspective views of the device of the present invention.
Figure 4:
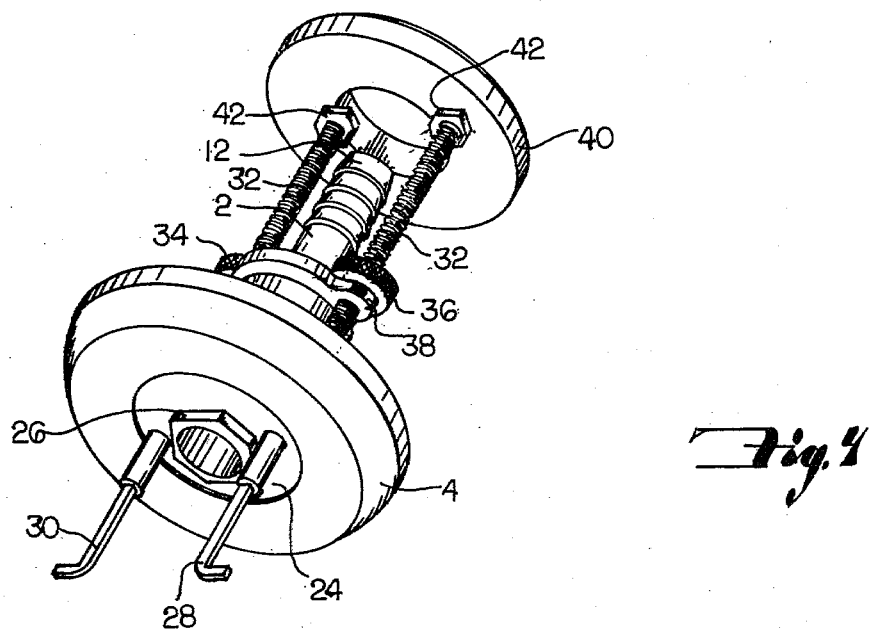

Referring to the drawings, the device of the present invention, generally referenced 1, comprises a conduit means 2 connected to the sealing means 4 by a threaded member 26. The conduit means 2 may be fabricated from a nonferrous metal, for example zinc or aluminum, or preferably from a resilient extruded plastics material. As shown in FIG. 1, the conduit means 2 has a portion of smaller diameter 6 and a portion of larger diameter 8 which defines a shoulder 10. As shown in FIG. 2, the smaller diameter portion 6 of the conduit means receives a flexible tube 7, such as a hose pipe made of rubber or plastics material, which is connected to a source of fluid under pressure. In FIG. 2, the hose 7 is provided with a conventional female hose pipe connector 9 having a pipe threaded 11. Connection of the connector 9 with the faucet can be readily achieved by removing the aerator which is usually present in the outlet of the faucet and installing a converter. The converter simply converts the female faucet thread into a male pipe thread and thereby facilitates connection with connector 9.

For the purpose of this specification, the term "fluid" generally refers to water but it is also envisaged that it may be possible to employ a gas under pressure, for example, compressed air, to effect removal of the foreign material from the drain pipe. For the purposes of the present specification, the term "under pressure" means a pressure which is sufficient to effect satisfactory removal of foreign material in the drain pipe without bursting or otherwise damaging the drain pipe system. It has been found in practice that the standard pressure of water mains is generally satisfactory although a high water pressure can be used if this is found to be necessary. Generally speaking, a fluid pressure of twenty to sixty pounds per square inch, e.g. thirty to fifty pounds per square inch, e.g. thirty five to forty five pounds per square inch, has been found satisfactory. However, it is possible to employ pressures outside these ranges should the need arise. During use of the device, it is possible to employ a range of pressures according to the rate at which the foreign material is removed from the drain pipe.

In order to facilitate a push-fit connection of the hose 7 to the end of the conduit 6 and to provide a good grip for the hose, the conduit is formed on the exterior surface thereof with a series of ridges or other projections 12. If it is desired to use relatively high fluid pressures, for example sixty to ninety pounds per square inch, it is possible to more firmly secure the hose to the conduit by the use of a supplementary clamping means, for example a conventional screw ring clip 11' as shown in FIG. 2.

The resilient sealing means 4 is usually fabricated from rubber or a synthetic plastics material. As shown in FIG. 1, the diameter of the sealing means is larger than the diameter of the drain pipe 14. The sealing means 4 abuts against a sink 16 at a point 18 and does not contact the upper surface of sink strainer support 20. While it is possible to employ a sealing means which has a diameter substantially equal to the diameter of the drain pipe 14, it has been found in such cases that it is difficult to obtain an effective fluid seal. In order to prevent undue flexing of the sealing means with the possibility of breaking the seal at 18, the sealing means is preferably provided with a means of reinforcement, suitably metal washers 22 and 24 mounted in the upper and lower surfaces respectively of the sealing means 4.

The conduit means 6 is preferably secured to the sealing means by threaded member 26 which passes through hole 27 in sealing means 4. The member 26 is threadedly engaged with conduit means 6 as shown in FIG. 1, and is slidingly fitted into hole 27. This permits a small amount of flexing to occur as the device is tightened over the drain pipe 14 in use and, thereby, reduces wear to a minimum. In addition, this arrangement makes it possible to adjust or modify the device for use in different sized drain systems or for different fluid pressure ranges. Furthermore, it makes it possible to dismantle the device to replace any components which are damaged or worn.

The sealing means is detachably secured over the drain 14 by L-shaped rods 28 and 30. For the purposes of illustration, only two L-shaped rods are shown in the Figures, but it is possible to employ more L-shaped rods, depending on the fluid pressure to be employed and the diameter of the drain to be flushed. Generally speaking, as the diameter of the drain to be flushed increases, so preferably will the number of L-shaped rods in the device. It will be appreciated that as the number of L-shaped rods increases, it is possible to obtain a more even distribution of pressure at the point 18 with an increased likelihood of obtaining an effective fluid seal. The L-shaped rods are suitably made of metal and are provided with a threaded portion 32 which carries either a thumb nut screw 34 or a conventional hexagonal nut 36 depending on whether the device is to be installed entirely by hand or with the use of a wrench. In practice, the device is provided either entirely with thumb nut screws 34 or with nuts 36. One of each type is shown in FIG. 1 purely for the purposes of illustration. A plate 38 is mounted on the rods 28 and 30, with the conduit passing through the central hole 39 of the plate. The plate can be brought into abutment with the shoulder 10 of the conduit 6 by turning the thumb nuts 34. The hand of the thread 32 is such that when the thumb nut 34 is screwed to urge the plate 38 against shoulder 10, the rods 28 and 30 move in the opposite direction.

In order to prevent rotation and possible disengagement of the rods 28 and 30 from the strainer support 20 during rotation of the thumb nuts 34, a restraining means, suitably a metal washer 40, is mounted on the rods 28 and 30. The rods 28 and 30 are screwed into tapped holes 43 and 45 in the washer 40 and securely fixed thereto by means of locking nuts 42.

FIG. 2 shows an alternative embodiment of the device of the present invention incorporating a one-way valve arrangement 46 within the conduit means 2. The valve arrangement comprises a generally cone-shaped member 50 made of rubber or other suitable resilient sealing material which is biased against abutment points 48 by a coil spring 52. The coil spring is supported by a threaded member 54 similar to member 26 described above in connection with FIG. 1. This arrangement permits ready access to the valve arrangement within the conduit 2 to facilitate repair or replacement thereof.

Operation of the device of the invention will now be described. Prior to installation of the device over the mouth of the drain pipe, the lock nuts 42 are loosened to permit orientation of the L-shaped rods 28 and 30. This orientation will depend on the nature of the anchor point to which the L-shaped rods 28 and 30 will be engaged. Generally, the anchor point will be a strainer support ledge having detents therein to permit access of the L-shaped members. Alternatively, the anchor point may be a fixed sink strainer having a series of perforations therein or even a cross-member of the type generally found in laundry tubs and similar receptacles. Having arranged the L-shaped rods 28 and 30 in the desired orientation, the lock nuts 42 are tightened. The thumb nuts 34 are rotated away from the sealing means 4 to allow rods 28 and 30 to be moved through the sealing means 4 to an extent sufficient to permit engagement with the anchor point. The device is then placed centrally over the mouth of the drain pipe and positioned so that the rods 28 and 30 will engage with the anchor point upon tightening. Thumb nuts 34 are tightened evenly so that an effective seal is created between the sealing means 4 and the drain 14. With the device firmly in position, a hose is push-fitted to the conduit means 2 unless such a hose is already present on the device. The hose is connected to a water supply and the drain 14 is flushed by passage of water through the conduit means into the drain. When the flushing operation has been completed, the water supply is turned off, the hose is disconnected from the water supply and the thumb nut screws are loosened to permit the device to be removed from the mouth of the drain.

What is claimed is:

1. A device for flushing a drain pipe having an anchor point by applying fluid under pressure to the interior of the pipe, said device comprising:
   (a) conduit means for passing fluid therethrough under pressure;
   (b) resilient sealing means connected to said conduit means for providing a fluid tight seal between said sealing means and said pipe during passage of fluid through said conduit means;
   (c) securing means operatively connected to said sealing means for detachably securing said sealing means over the mouth of said pipe, said securing means including
      (i) restraining means including at least two restraining members each slidably engaged with said sealing means and having an anchoring portion engageable with said anchor point; and
      (ii) urging means operatively connected to said restraining member and said sealing means for urging said anchoring portions of said restraining member against said anchor point simultaneously with urging said sealing means into sealing engagement with said pipe to create said seal; and
   (d) disengagement prevention means including an apertured transverse locking member engageable with and interconnecting said restraining members at a point between said urging means and the end of said restraining members opposite from said anchoring portions for preventing rotation and disengagement of said restraining means from said anchor point when said sealing means is brought into sealing engagement with said pipe.

2. A device according to claim 1, wherein said restraining members include at least two L-shaped members extending through said sealing means and engageable with said anchor point.

3. A device according to claim 2, wherein said means engageable with said restraining members includes a plate connected to said L-shaped members and engageable with said conduit means for urging said L-shaped members into engagement with said anchor point simultaneously with urging said sealing means into sealing engagement with said pipe.

4. A device according to claim 3, wherein thumb nut screws are provided on said L-shaped members for effecting said engagement.

5. A device according to claim 4, wherein said disengagement prevention means includes a washer firmly mounted on said L-shaped members for preventing rotation of said L-shaped members.

6. A device according to claim 5, wherein lock nuts are provided on said L-shaped members to firmly secure said washer thereto.

7. A device for flushing a drain pipe of a sink having an anchor point for applying water under pressure to the interior of the pipe, said device comprising:
   (a) conduit means for passing water therethrough under pressure, said conduit means having a portion of smaller diameter and a portion of larger diameter forming a shoulder on the exterior of said conduit means, said portion of smaller diameter being provided with means for connection to a faucet for supplying water to said conduit means;
   (b) resilient sealing means connected to said larger diameter portion of said conduit means for providing a water tight seal between said sealing means and said pipe during passage of water through said conduit means;
(c) securing means operatively connected to said sealing means for detachably securing said sealing means over said drain pipe, said securing means including
  (i) at least two diametrically opposed radially equidistant L-shaped members in sliding engagement with and extending through said sealing means and being engageable with said anchor point;
  (ii) transversely extending means connected to said L-shaped members and extending transversely between said L-shaped members for exerting pressure on said shoulder of said conduit means; and
  (iii) threaded means mounted on said L-shaped members and engageable with said transversely extending means to urge said L-shaped members against said anchor point to create said seal; and
(d) disengagement prevention means engageable with said L-shaped members for preventing rotation and disengagement of said members from said anchor point when said sealing means is brought into sealing engagement with said pipe, said disengagement prevention means including an apertured locking member firmly secured to and interconnecting said L-shaped members at a point between said threaded means and the end of said L-shaped members opposite from said anchor point and extending transversely between said L-shaped members.

8. A device according to claim 7, wherein said conduit means is formed from a plastics material.

9. A device according to claim 8, wherein said sealing means is formed from rubber.

10. A device according to claim 9, wherein said sealing means is provided with a reinforcing metal washer in each opposed major surface thereof.

11. A device according to claim 7, wherein said conduit means is provided internally thereof with a biased valve means for permitting flow of water through said conduit means into said drain pipe and preventing flow of water from said drain pipe back through said conduit means.

12. A device according to claim 11, wherein said biased valve means includes a cone-shaped resilient member for sealing said conduit means from flow of water therethrough, said cone-shaped member being abuttable against an interior surface of said conduit to produce said seal, and a coil spring urging said cone-shaped member into sealing engagement with said interior surface.

* * * * *